Mar. 13, 1923.
O. MULLER, JR., ET AL
WIRE FABRIC MANUFACTURE
Filed Sept. 20, 1919
1,448,566
5 sheets-sheet 1
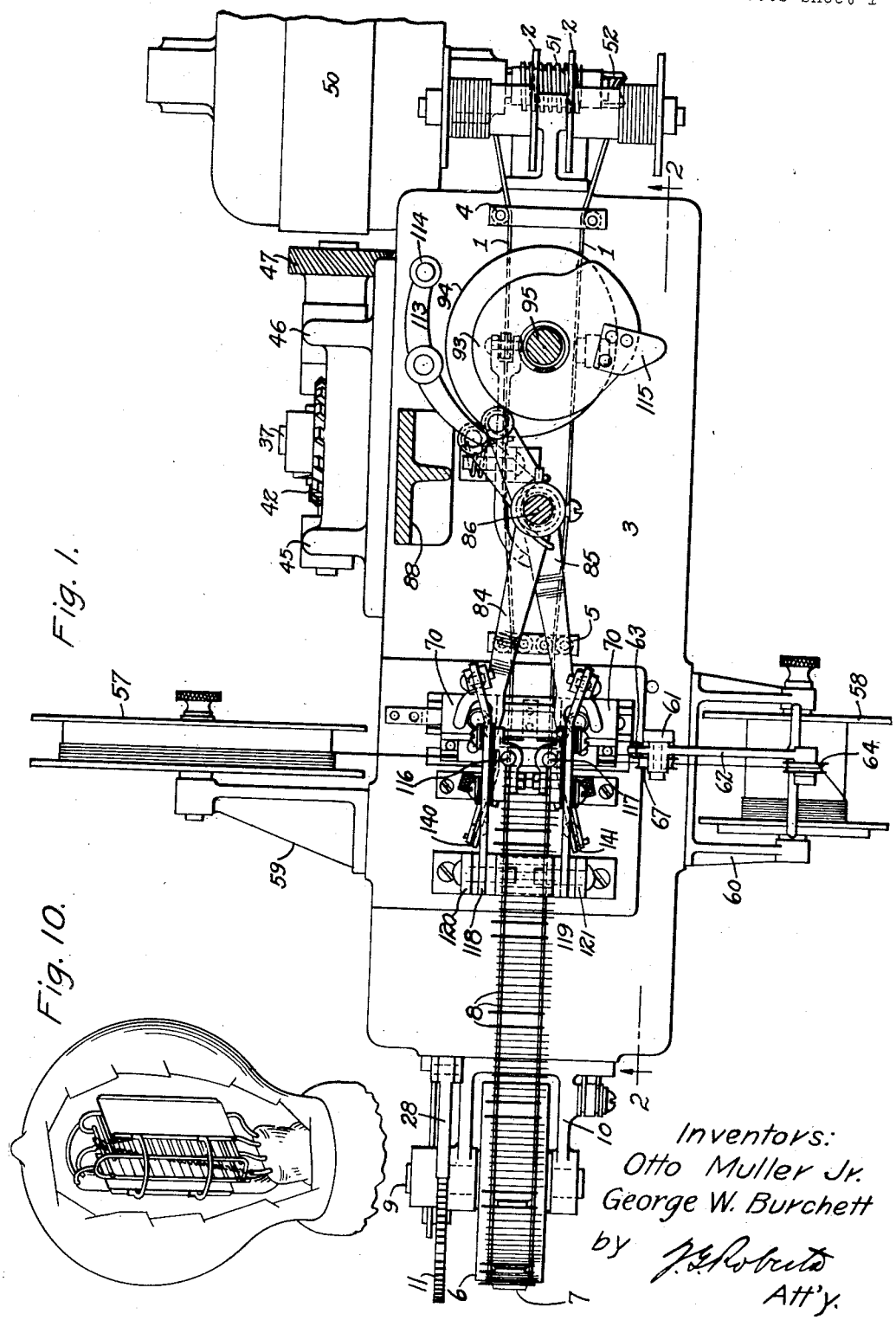
Inventors:
Otto Muller Jr.
George W. Burchett
by J. F. Roberts
Att'y.

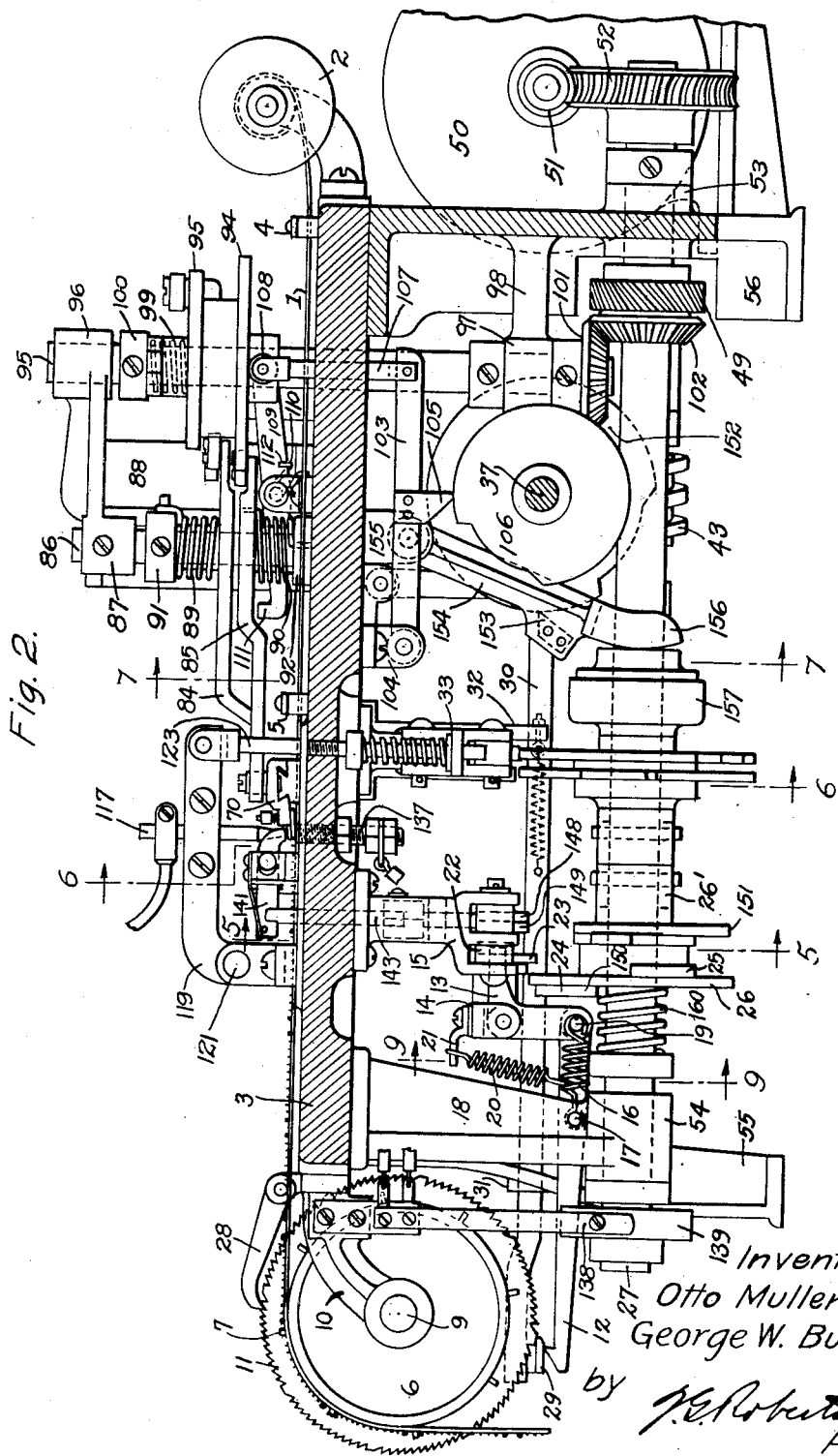

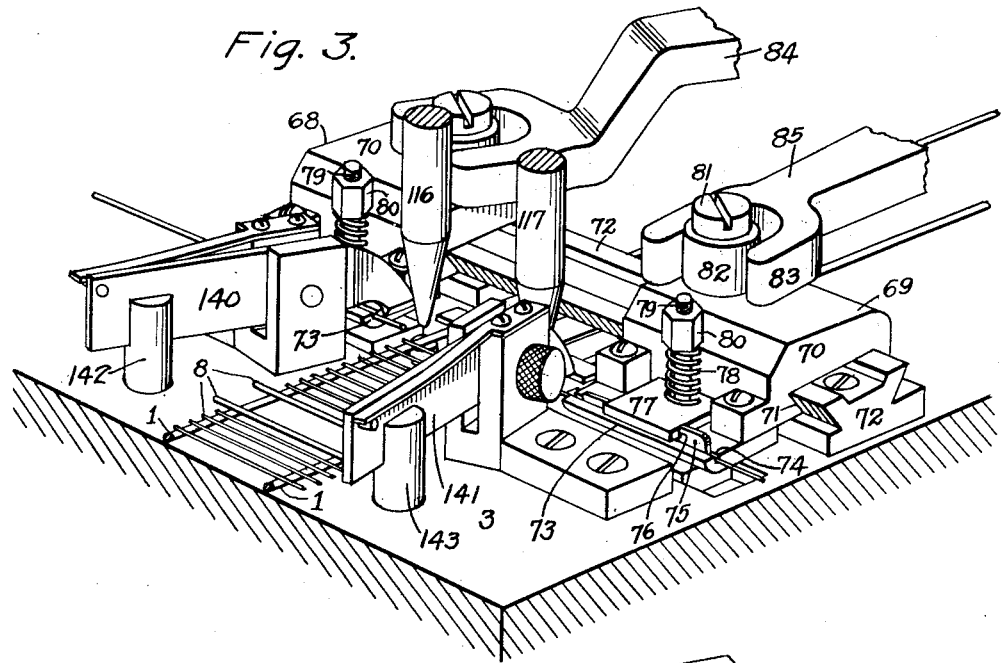
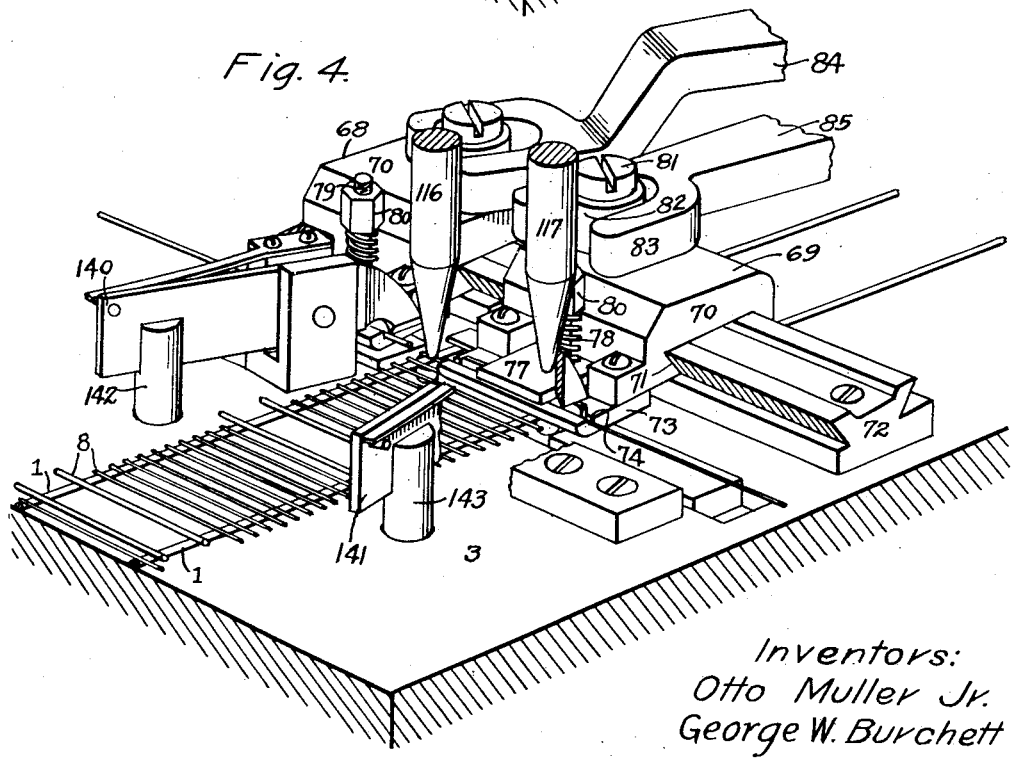

Mar. 13, 1923.
O. MULLER, JR., ET AL
1,448,566
WIRE FABRIC MANUFACTURE
Filed Sept. 20, 1919     5 sheets-sheet 4
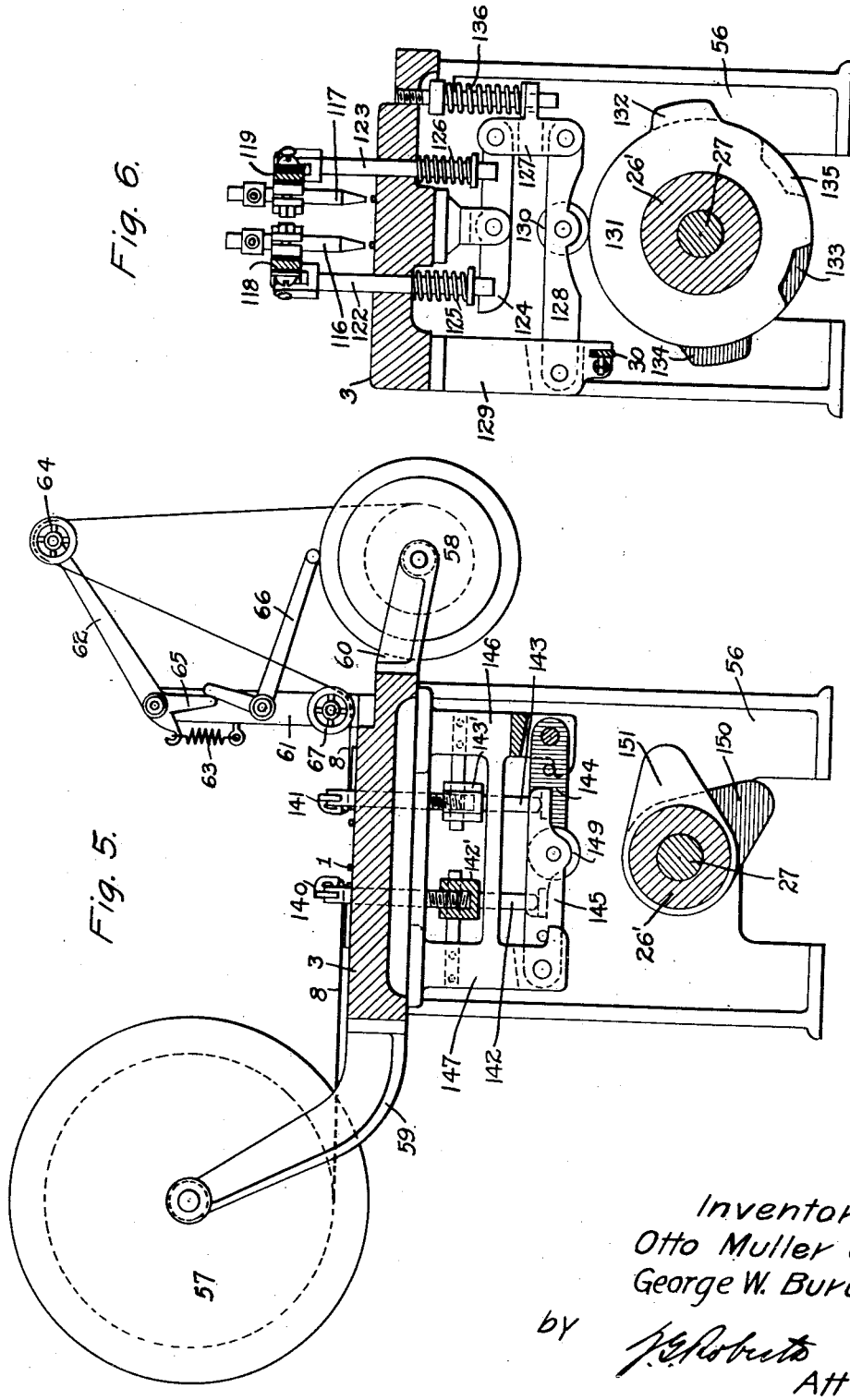
Inventors:
Otto Muller Jr.
George W. Burchett
by
J. E. Roberts
Att'y.

Mar. 13, 1923.
O. MULLER, JR., ET AL
1,448,566
WIRE FABRIC MANUFACTURE
Filed Sept. 20, 1919     5 sheets-sheet 5
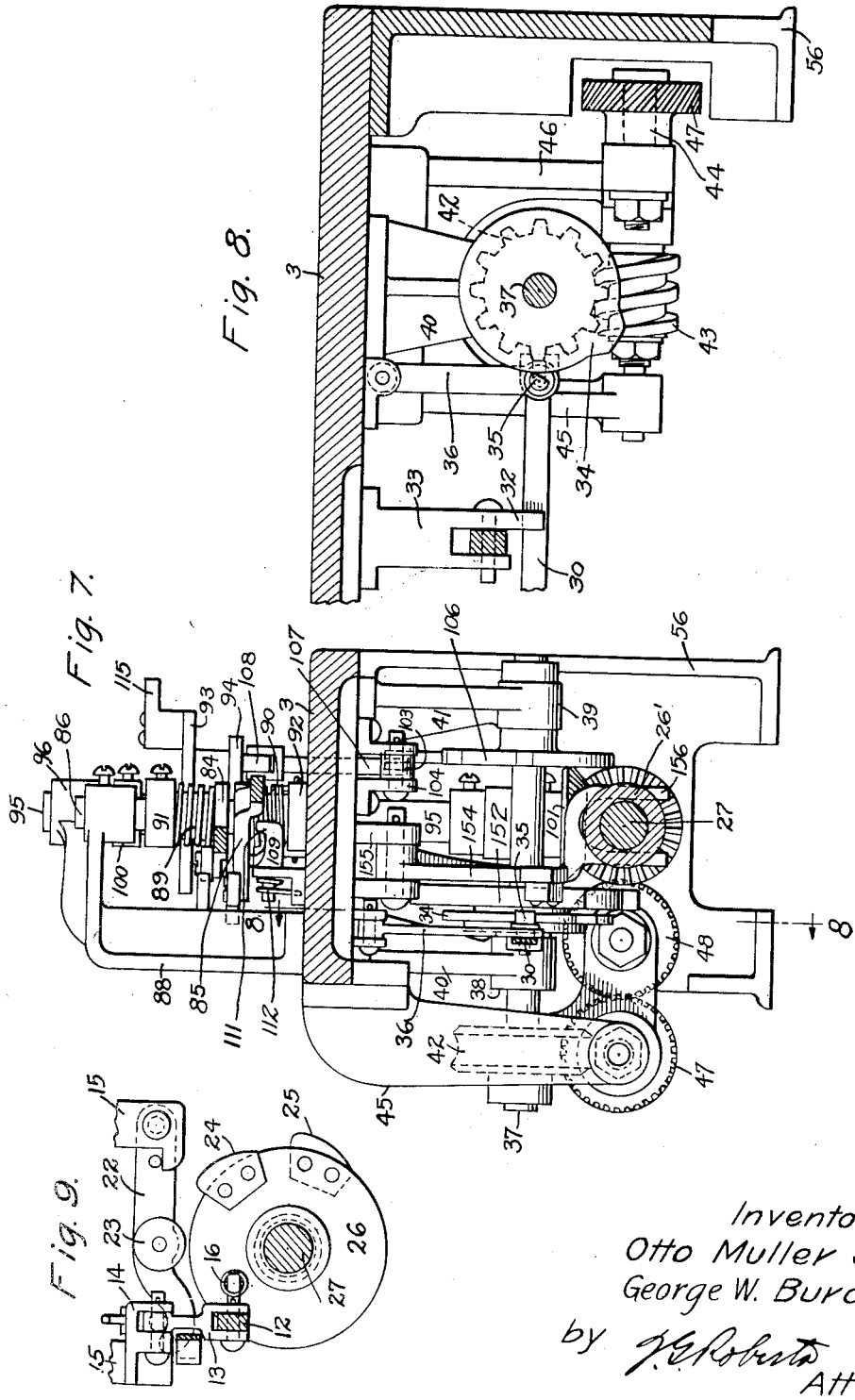
Inventors:
Otto Muller Jr.
George W. Burchett
by J. E. Roberts
Att'y.

Patented Mar. 13, 1923.

1,448,566

UNITED STATES PATENT OFFICE.

OTTO MULLER, JR., OF BROOKLYN, NEW YORK, AND GEORGE W. BURCHETT, OF JERSEY CITY, NEW JERSEY, ASSIGNORS TO WESTERN ELECTRIC COMPANY, INCORPORATED, OF NEW YORK, N. Y., A CORPORATION OF NEW YORK.

WIRE-FABRIC MANUFACTURE.

Application filed September 20, 1919. Serial No. 325,270.

*To all whom it may concern:*

Be it known that we, OTTO MULLER, Jr., and GEORGE W. BURCHETT, citizens of the United States, residing at Brooklyn, in the county of Queens and State of New York, and at Jersey City, in the county of Hudson and State of New Jersey, respectively, have invented certain new and useful Improvements in Wire-Fabric Manufacture, of which the following is a full, clear, concise, and exact description.

This invention relates to a machine for making wire fabric, and has particular reference to the manufacture of wire mesh grids such as are used in vacuum tubes.

It has for an object to produce, in the form of a continuous fabric of any desired length, a welded structure comprising a regular series of intersecting wires.

It has for a further object to provide such a structure, as above described, wherein, across a plurality of strand wires, successive series of cross wires of predetermined dimensions are fed and welded thereto, and having space intervals of desired dimensions between each series.

It has for a further object the provision of mechanical improvements in wire fabric-making machines whereby the above-mentioned objects may effectively be achieved.

The machine whereby the above-mentioned objects are accomplished comprises, in general, a mechanism wherein a plurality of strand wires are fed from reels across the machine under suitable welding electrodes and beneath which electrodes, cross or stay wires of different sizes are fed and welded thereto. At predetermined intervals in the feed of the cross wires, an increased motion is given to the mechanism which feeds the fabric forward so as to produce a gap or space interval between certain of the stay wires greater than normal. Mechanisms are also provided for cutting off the stay wires as they are fed across the strand wires, and for periodically feeding wires of different size across the strand wires. Mechanisms are further provided whereby, at predetermined intervals, the actions of each of the following mechanisms are reversed—

1. The mechanism for welding the intersecting wires,

2. The mechanism for cutting the stay wires,

3. The mechanism for feeding the different sized stay wires across the strand wires.

The mechanisms for accomplishing the above-mentioned objects are hereinafter claimed and described in detail, and are disclosed in the drawings, of which Fig. 1 represents a plan view, partly in section, of the machine; Fig. 2 represents an elevation of part of the machine viewed from in front of a section plane taken on the line 2—2 of Fig. 1; Fig. 3 represents a perspective view, enlarged, of part of the machine showing the stay wire feeding, cutting, and welding mechanisms; Fig. 4 is a similar view showing the same parts in a different relative position; Fig. 5 is a cross section on the line 5—5 of Fig. 2 showing the mechanism for reversing the stay wire cutting mechanism; Fig. 6 is a cross section taken on the line 6—6 of Fig. 2 showing the mechanism for reversing the action of the welding electrodes; Fig. 7 is a cross section taken on the line 7—7, Fig. 2, showing the relation of the various operating shafts and cams thereon; Fig. 8 is a cross section taken on the line 8—8, Fig. 7, showing how the mechanism for reversing the action of the stay wire feeding devices receives its motion; Fig. 9 represents a cross section taken on the line 9—9, Fig. 2, showing the mechanism for advancing the fabric; and Fig. 10 represents a perspective view of a vacuum tube in which the grid, made by this machine, is used.

The machine comprises, as shown in the drawings, several cooperating mechanisms which are hereinafter described in detail, the first of these being the

*Wire feeding mechanisms.—Strand wires.*

Strand wires 1, 1 are wound over reels 2, 2 and extend therefrom across a base plate 3 between guide rollers 4 and 5 to a feed wheel 6, over which the completed fabric passes and by which it is gripped and fed step by step forwardly. The wheel 6 has on its periphery ribs 7, suitably spaced, which are adapted to engage with the cross or stay wires 8 of the fabric and feed the fabric forward. The roller wheel 6 is mounted on a shaft 9, which is journalled in bearings in a bracket 10 fastened to one end of the base plate 3. A ratchet wheel 11 is also fastened to the shaft 9. This ratchet is provided with a regularly recurring series of teeth of predetermined size and is adapted to be actuated therethrough by a pawl 12. This pawl 12 is pivoted at one end to a bell-crank lever 13, which is pivoted in a bracket 14 attached to a bracket 15 which is attached to the base plate 3. (See Figs. 2 and 9.) The pawl 12 is held in its forward position ready to actuate the ratchet wheel 11, by means of a spring 16, attached at one end to a pin 17 on a bracket 18 attached to the base plate 3 and at the other end to a pin 19 on the bell-crank lever 13. The pawl 12 is held up in position adjacent the ratchet wheel 11 by means of a spring 20, attached at one end to the pawl 12 and at the other end to a projecting lug 21 on the bracket 14. The bell-crank lever 13 is actuated by means of its engagement with the outer end of a lever 22 (see Fig. 9) which is pivoted at the other end to bracket 15. This lever 22 has a roller 23 thereon which is adapted to be engaged at regular intervals by cam surfaces 24 and 25 on a disk 26 attached to a sleeve 26' mounted on a main shaft 27. (See Figs. 2 and 9.) The two surfaces 24 and 25 are situated at opposite sides of the disk 26 because, as will be later explained, the sleeve 26' is moved endwise at intervals, and because the cam surfaces are on the opposite sides of the disc 26 the pawl 12 is actuated whatever position the sleeve 26' is in. A stop pawl 28 is provided to prevent any backward movement of the ratchet wheel 11.

The normal distance through which the pawl 12 is moved periodically is greater than the distance between the normal teeth on the ratchet wheel 11. In order, therefore, that the pawl shall feed the wheel only the space between two teeth, except at stated intervals, the beveled plate 29 (see Fig. 2) is provided and is positioned between the teeth of the ratchet wheel 11 and the end of the pawl 12. This plate is on the end of a long rod 30 which is supported and guided at two points, one in a bearing 31 in bracket 18, above mentioned, and the other in a slot 32 in a bracket 33, to be later described, which is attached to the base plate 3. In order, at intervals, to permit the pawl 12 to move the ratchet wheel 11 to its fullest ability, the plate 29 is moved away from between the ratchet teeth and the pawl. This movement is effected by the engagement of a cam surface 34 (see Fig. 8) with a roller 35 mounted on the lower end of a lever 36 which is pivoted to the base plate 3 and to the lower end of which is also pivoted the end of the rod 30. The cam 34 is mounted on a shaft 37 (see Figs. 7 and 8) which is journalled in bearings 38 and 39 on brackets 40 and 41 attached to the base plate 3. At one end of the shaft 37 is a gear 42 which meshes with a worm gear 43, mounted on a shaft 44 journalled in brackets 45 and 46 attached to the base plate 3. At one end of the shaft 44 is a gear 47 which meshes with a gear 48 also journalled in the bracket 46 and which gear 48 in turn meshes with a gear 49 (see Fig. 2) on the main power shaft 27.

The main power shaft 27 receives its motion from a motor 50 to which is attached a worm gear 51 meshing with a main power gear 52 on the shaft 27. The shaft 27 is journalled in bearings 53 and 54 in the end vertical standards 55 and 56 of the machine. The standards 55 and 56 support the main base plate 3.

*Wire-feeding mechanisms.—Stay wire feeding.*

The stay wires, which are of two different sizes, are fed in across the strand wires from opposite sides of the machine. They are wound on reels 57 and 58 which are suitably journalled in brackets 59 and 60 attached to the base plate 3. The grid structure made by this machine comprises a series of stay wires of a definite size bounded at each end by wires of heavier material. Therefore it becomes necessary at intervals to alternate the feed of the wires so as to feed the heavier wires across the strand wires. The heavier wires are wound on reel 57 and the lighter wires are wound on reel 58. Since the lighter wires are fed more often and continuously than the heavier wires and have less rigidity, a tensioning device is provided so as to make the feed more uniform. This device comprises an upright standard 61 mounted on the base plate 3 to the upper end of which is pivoted a bell crank lever 62. One end of this lever 62 is held normally downward by a spring 63 attached at one end to the lever and at the other to the standard 61. The other end of the lever 62 is provided with a roller 64 over which the wires from the reel 58 are adapted to pass. The lever 62 is also provided with a side extension 65 adapted to engage one end of a bell crank lever 66 also pivoted to the standard 61, the other end of the lever 66 adapted to rest on the periphery of the reel 58. The wires from the reel 58 also pass under a wheel 67 mounted on the standard 61. It will be seen that when the stay wires are fed forward their feed exerts a pull downward on the wheel 64 which tends to move the lever arm 65 to the left and thereby remove its pressure from the lever 66 and consequently from the reel 58. When the feed movement of the wires ceases, the downward pull on the wheel 64 ceases and the spring 63 through lever 62 and lever 65 exerts its pressure on reel 58 tending to hold it stationary and prevent it from over-running. (This mechanism is shown in Fig. 5.)

The stay wires are gripped by mechanisms more clearly shown in Figs. 3 and 4. They comprise two gripper arms 68 and 69, one for the heavy wire and the other for the lighter wire respectively. Since the detail construction of each of these arms is the same, I shall describe only one. It comprises a main body portion 70 which has a lower and longitudinal beveled slot 71 therein, in which slot a beveled bar 72 attached to the main base plate 3 is adapted to fit. The body portion 70 is adapted to reciprocally slide back and forth on the bar 72 in its motion to feed the wires. This body portion has a forwardly extending horizontal portion or ledge 73 formed with a groove 74 in which the wires are passed. In the groove, over the wires is placed a bar or key 75. The key fits in a slot 76 in the lower face of the plate 77. The plate 77 is pressed down on the bar 75 and the wires by a spring 78. This spring embraces a bolt 79 which is screwed into the ledge 73 from below, and between a nut 80 on which and the plate 77, the spring 78 is adapted to extend. The upper surface of the body portion 70 is provided with a stud bolt 81 on which is loosely mounted a roller 82. This roller is adapted to be embraced by a yoke-member 83.

As shown in Figs. 1 and 2, one of the yoke-members 83 is attached to an arm 84 and the other is attached to an arm 85. These arms 84 and 85 are adapted to feed the heavy and the light wires respectively. These arms 84 and 85 are pivoted to a vertical shaft 86. This shaft is journalled at its upper end in a bearing 87 forming part of an upright bracket 88 mounted on the base plate 3, and at its lower in the base plate 3. Around the shaft 86 and adjacent the arms 84 and 85 are two springs 89 and 90. These springs are connected at one end respectively to sleeves 91 and 92 rigidly fastened to shaft 86 and at the other end to the arms 84 and 85 respectively. Spring 89 tends to move the arm 84 backward after it has been positively driven forward by cam action. The spring 90 tends to move the arm 85 forward and said arm is moved backward positively by cam action. The difference in the action of springs and cams on these arms is for the reason that the arm 84 feeds the heavy wire, which is fed only intermittently, whereas the arm 85 feeds the light wires which are fed most of the time. The arms 84 and 85 are actuated by cams 93 and 94 respectively which are mounted and fastened to a vertical shaft 95. Shaft 95 is journalled at its upper end in bearing 96 forming part of the vertical standard 88 and at its lower end is journalled in a bearing 97 in a bracket 98 attached to the side standard 56. The two cams 93 and 94 are integrally connected and tend to be moved normally downward by the action of a spring 99 which is positioned between the cam 93 and a sleeve 100 fastened to the shaft 95.

The cams 93 and 94 are rotated through the shaft 95 since on the lower end of this shaft is mounted a gear 101 meshing with a gear 102 on the main shaft 27. Since only one set of wires is to be fed at a time only one set of cams is to be in action at a time. Therefore the cams 93 and 94 are adapted to slide up and down on the shaft 95 so that they may be singly and alternately brought into action with their respective feed arm rollers. The mechanism for doing this comprises an arm 103 pivoted to a bracket 104 on the base plate 3 and having intermediate its length a projection 105 which is adapted to engage with the surface of a cam 106, mounted on shaft 37. The outer end of arm 103 is connected to a vertical arm 107 projecting through an aperture in the base plate 3 and having on its upper end a roller 108 adapted to bear against the lower surface of the cam 94. The movement of the arm 107 is so timed that the proper cam is engaging with the proper feed arm at the desired time.

At the time when the arm 84 is feeding the heavy wires forward, and, remembering the fact that the arm 85 is tending always to move forward under the action of the spring 90, at this time it becomes necessary to provide means to hold the arm 85 in its retracted position. This is provided and comprises (see Fig. 2) an arm 109 pivoted in a bracket 110 on the base plate 3. At one end this arm bears up against the lower surface of the cam 94 and at its other end has an upwardly extending lug portion 111. A spring 112 tends to hold the lug portion 111 always down. It will be seen that whenever the cams 93 and 94 are in their lower position, in which position they are causing the feed of the heavy wire, that the lug portion 111 is up in front of the arm 85 holding it in its retracted position.

A mechanism is also provided so that the arm 84, when it has fed the wire forward is moved back positively at the end of its travel, especially if the spring 89 which is supposed to move it back does not function properly. This is for the purpose of preventing the two feeding mechanisms from getting tangled up and interfering with one another. This mechanism comprises a curved pivoted lever 113 one end of which is adapted to bear against the outer end of arm 84 and the other end of which carries a roller 114. This roller 114 is adapted to be engaged, when the cam 93 is in action, by a lug 115 on cam 93. This lug is so spaced that arm 84 is given a short quick blow at the end of its time period of travel, if, by that time, the spring 89 has failed to move it entirely back to its full retracted position.

Wire welding mechanism.

The mechanism for welding the intersecting wires together comprises a pair of silver-tipped copper electrodes 116 and 117. These electrodes are fastened by suitable clamps to the mid-portion of levers 118 and 119 respectively. The clamps which hold the electrodes are insulated from the rest of the machine in any suitable manner. The levers 118 and 119 are pivoted at one end to brackets 120 and 121 mounted on the base plate 3. The other ends of levers 118 and 119 are connected to rods 122 and 123 which extend through apertures in the base plate 3. At their lower ends these rods are connected to opposite ends of a lever 124 (see Fig. 6). Between the under side of the base plate 3 and the upper edge of lever 124 are two springs 125 and 126 respectively embracing the rods 122 and 123. These springs tend to keep the rods and consequently the electrodes in a neutral position with respect to the wires to be welded when welding is not taking place. One end of lever 124 is connected to a link 127 which in turn connects to a lever 128. Lever 128 is pivoted at one end to a bracket 129 attached to the base plate 3. A roller 130 on the middle portion of the lever 128 is adapted to be moved by a cam 131 having a plurality of cam surfaces 132, 133, 134, 135 which are arranged in pairs on opposite sides of the cam 131. The cam 131 is mounted on the sleeve 26′. Link 127 has a projecting lug on it, through an aperture in which extends a rod the upper end of which is fastened adjustably in the base plate 3. Between the base plate 3 and the lug on link 127 is a spring 136 which tends to return the system to normal after its actuation by the cam surfaces.

When wire is being fed in from one side of the machine, it will be evident that the electrode farthest from the feed reel must be actuated first, so that the end of the wire projecting farthest from the reel will be welded down before the feed device starts to move back. Otherwise the feed device would carry the wire back with it. Since wires are fed in from both sides of the machine, it is easily seen that some means is necessary to reverse the action of the welders. This mechanism comprises the two pairs of cams above mentioned. By shifting the sleeve 26′ so that one pair is alternated with another on the roller 130, and by so positioning them that their action on the roller is reverse, we get the desired effect. The mechanism for shifting the sleeve 26′ will later be explained. The electrodes 116 and 117 are adapted to engage the wires to be welded between themselves and lower stationary electrodes 137. These electrodes 137 extend up through insulated bushings in the base plate 3 to the desired level just beneath the wires to be welded and are connected in their lower ends to suitable circuit wires. The circuit wires are connected to suitable switching means comprising spring switches 138 located at the left of the machine which are actuated by a cam 139.

This actuation is so timed that the circuit through the electrodes 116 and 117 is made before the circuit is closed through the switch 138 and the circuit is opened at the switch 138 before it is opened at the electrodes 116 and 117. This action is made necessary by the desire to avoid excessive sparking at the points of the electrodes which destroys them.

Wire-cutting mechanism.

When a wire is fed in from one side and the outer end is first welded and then the inner end, at this time it becomes necessary to cut off the wire between the inner point of the weld and the reel so that the fabric may be moved onward for the feed of the next cross wire. Consequently, when the feed of the wires is reversed the cutting action must be reversed. To this end there is provided a mechanism for performing the above-mentioned function which comprises pivoted cutters 140 and 141 which at their rear ends are connected to two-piece rods 142 and 143. Intermediate their length these rods are provided with suitable adjusting screws 142′ and 143′ so that the movement of the cutters 140 and 141 may be regulated. These rods rest on the ends of pivoted levers 144 and 145, pivoted in brackets 146 and 147 attached to the base plate 3. At the ends of the levers 144 and 145 (Fig. 5) are a pair of rollers 148 and 149 (Fig. 2) adapted to be actuated by cam surfaces 150 and 151 respectively. These cam surfaces are mounted on the sleeve 26′ and when the position of the sleeve 26′ is changed the cam surfaces are brought into play on one or the other of the levers 144 or 145. In this way the reversal of the cutters is provided for.

Mechanism for shifting the cam sleeve.

This mechanism comprises a cam 152 mounted on shaft 37 which is adapted to actuate a projection 153 on a lever 154, the upper end of which is pivoted in a bracket 155 attached to the base plate 3 and the lower end 156 of which bears against a collar 157 on the sleeve 26′.

Operation of the machine.

We shall begin the consideration of the operation of the machine at the instant the first of the series of lighter wires is about to be fed across the strand wires 1—1. At this time the cam 94 is in engagement with the feeding arm 85. The sleeve 26' is in its extreme left-hand position (see Fig. 2) with the lower end of lever 154 bearing against collar 157 on the sleeve 26' and with the projecting lug 153 on said lever riding on the edge of cam 152. The cam shaft 95 is now rotated by the mechanism heretofore described and this rotation causes the cam 94 to gradually withdraw from the roller on the end of gripper arm 85 whereby the spring 90 may move said gripper arm 85 forward to feed the lighter wire from the reel 58 across the strand wires. This cam action is timed to permit the movement of the cross wire the desired distance. When the cross wires have reached the desired position the welding electrodes are brought into play by the action of cam 131 on the sleeve 26'. This pair of cam surfaces on cam disc 131 is brought into play, which will cause the depression of electrode 116. This electrode is the one farthest from the reel 58 and its depression causes the welding of the outer end of the stay wire to the adjacent strand wire. Immediately thereafter the other electrode is depressed to weld the stay wire to the other strand wire. In the meantime the cam 94 has caused gripper arm 85 to be positively moved backward into its retracted position. While moving back into this position the gripper arm 85 does not move the stay wire back. First, because the wire is welded to the strand wires as above mentioned, and secondly, because the particular form of the gripper mechanism shown in Figs. 3 and 4 and heretofore described will permit the stay wires to slide in the gripper if sufficient force is brought into play. Immediately after the second electrode 117 acts, the cutting knife 141 is brought into play by means of the cam 150 on the shaft 27. This completes the feeding of the stay wire, the welding of it to the strand wires and the cutting off of the stay wire section.

Immediately after this action is completed, one of the cam surfaces 24 and 25 on the cam disc 26 mounted on sleeve 26' (shown in Fig. 9) actuates the bell crank lever 13 to cause pawl 12 to move ratchet wheel 11, whereby the roller wheel 6 is moved one step forward and by its movement and engagement with the completed fabric moves the same forward one step so that the mechanism is ready for the feeding of the second of the series of stay wires.

This series of actions is repeated as long as it is desired to feed the lighter of the stay wires. When, however, the heavier stay wires are to be fed across, then the configuration of cam disc 106 causes the projection 105 to be lowered, thereby lowering roller 108 and with it the cams 93 and 94. This action results in the disengagement of cam 94 from the gripper arm 85 and the engagement of cam 93 with the gripper arm 84. At the same time that these cams are lowered the lever 109 is moved so that the projecting lug 111 on the end thereof is moved upwardly in front of gripper arm 85 so that its movement forward is prevented at the same time that cams 93 and 94 are lowered as above described. The cam 152 is so turned as to permit the lever 154 to drop away from the collar 157 on the sleeve 26' and permit the spring 160 at the left of the sleeve 26' to move the various cam discs thereon on the right.

The heavier stay wire from relay 57 is now fed forward by the action of cam 93 and when it reaches a desired position is welded first at its outermost point and then at the point nearest the reel 57 and then is cut off by the cutting knife 140. This series of actions, it will be noted, is the reverse of the series just above described. This reversal is caused by the above-mentioned shifting of the sleeve 26' and is brought about for the reason that the wires now being fed in, are fed in from the opposite direction and therefore the welding and the cutting must be reversed.

It will be noted from an inspection of the completed fabric shown in Fig. 1 that a larger space exists between the two heavier stay wires than exists between the lighter stay wires. In order to provide this greater space, the cam surface 34 is so timed as to act on the rod 30 immediately after the first heavy stay wire has been fed across and welded. By acting on rod 30 to move it toward the left, the plate 29 on the end of rod 30 is withdrawn from between the pawl 12 and the teeth on ratchet wheel 11. Consequently, on the next actuation of pawl 12 by the cam means above described the pawl is permitted to move along in contact with the teeth to the full extent of its stroke so that when it moves back it will move the ratchet wheel a maximum amount. Immediately thereafter the cam 34 causes the plate 29 to be reinserted between the pawl 12 and the ratchet wheel 11 so that the subsequent action of the pawl is normal again.

The motor supplies power to the main shaft 27 by means of worm gears 51 and 52. Power is supplied to the shaft 37 by means of the pinions 49, 48, 47, 43 and 42. Power is supplied to the shaft 95 by means of the bevelled pinions 102 and 101.

In Fig. 10 there is shown a vacuum tube in which the preferred form of this invention is used, namely, an integral double surface grid electrode. It will be noted that the heavier stay wires form the upper and lower end wires of each surface and that the lighter stay wires form the active electrode surface,

What is claimed is:

1. A machine for making wire fabric comprising mechanism for feeding strand wires, a plurality of mechanisms for feeding stay wires across the strand wires from opposite sides thereof, and mechanism alternately to actuate the stay wire feed mechanisms.

2. A machine for making wire fabric comprising mechanism for feeding strand wires, a plurality of mechanisms for feeding stay wires across the strand wires from a plurality of sources, and mechanism selectively to actuate the stay wire feed mechanisms.

3. A machine for making wire fabric comprising mechanism for feeding strand wires, a plurality of mechanisms for feeding stay wires of different sizes across the strand wires, and mechanism selectively to actuate the stay wire feed mechanisms.

4. A machine for making wire fabric comprising mechanism for feeding strand wires, mechanism for selectively feeding stay wires across said strand wires from a plurality of sources, and mechanism for welding the strand and stay wires at their intersections.

5. A machine for making wire fabric comprising mechanism for feeding strand wires, a plurality of mechanisms for feeding stay wires across the strand wires in opposite directions, mechanism to actuate said stay wire feed mechanisms, mechanism for welding successively the strand and stay wires at their intersections, and mechanism to change the order of the action of the welding mechanism on the wires upon change of direction of the feed of the stay wires.

6. A machine for making wire fabric comprising mechanism for feeding strand wires, a plurality of mechanisms for feeding stay wires across the strand wires in opposite directions, mechanism to shift the feed of the stay wires from one direction to another, mechanism for cutting the stay wires adjacent their feed mechanisms, and mechanism to reverse the action of the cutting mechanism as the stay wire feeding mechanism is reversed.

7. A machine for making wire fabric comprising mechanism for feeding strand wires, a plurality of mechanisms for feeding stay wires across the strand wires in opposite directions, mechanism to shift the feed of the stay wires from one direction to another, mechanism for welding the strand and stay wires at their intersections, mechanism for cutting the stay wires adjacent their feed mechanism, and mechanism to reverse the action of the cutting and welding mechanisms upon the shifting of the stay wire feed mechanism.

8. A machine for making wire fabric comprising mechanism for feeding a plurality of parallel strand wires, mechanisms for feeding stay wires across the strand wires in opposite directions, mechanism for successively welding the points of intersection of the strand and stay wires in a given order, and mechanism for reversing the order of action of the welding mechanism upon change in the direction of feed on said stay wires.

9. A machine for making wire fabric comprising mechanism for feeding a plurality of parallel strand wires, mechanism for feeding stay wires across the strand wires in opposite directions, mechanism for cutting the successive stay wires adjacent their feed mechanisms, and mechanism to reverse the action of the cutting mechanism upon change in direction of the feed of said stay wires.

10. A machine for making wire fabric comprising mechanism for feeding a plurality of parallel strand wires, mechanism for feeding stay wires across the strand wires in opposite directions, a plurality of welding electrodes adapted to be actuated to successively weld the points of intersection of the strand and stay wires in a given order, a plurality of cutters adapted to be operated in a given order to cut the successive stay wires adjacent their feed mechanisms, and mechanism to reverse the order of action of the cutting and welding mechanisms upon change in the direction of the feed of said stay wires.

11. A machine for making wire fabric comprising a revoluble carrier over which the completed fabric is adapted to pass, means on said carrier to engage the fabric, means to actuate said carrier, means interposed between said carrier and said actuating means to limit the full active engagement of said actuating means with said carrier, and means for periodically removing said interposed limiting means from the path of the actuating means.

12. A machine for making wire fabric comprising a revoluble carrier over which the completed fabric is adapted to pass, means on said carrier to engage the fabric, a ratchet associated with said carrier, a pawl adapted to actuate said ratchet, means to actuate said pawl, a plate normally interposed between the pawl and the ratchet ..ong part of the path of actuating movement of the pawl, and means to periodically move said plate from the path of the pawl.

13. A machine for making wire fabric comprising means for feeding strand wires, means for feeding stay wires across the strand wires, a plurality of electrodes to weld the strand wires and stay wires at their points of intersection, means to actuate said electrodes in one order, means to actuate said electrodes in another order, and means periodically to change the operation of said electrodes from one order to another.

14. A machine for making wire fabric comprising means for feeding strand wires, means for feeding stay wires across the strand wires, a plurality of electrodes to weld the strand wires and stay wires at their points of intersection, cam mechanism to actuate said electrodes in one order, cam mechanism to actuate said electrodes in another order, and cam mechanism to change the operation of said electrodes from one order to another.

15. A machine for making wire fabric comprising means for feeding strand wires, means for feeding stay wires across the strand wires, a plurality of cutters to cut the stay wires, means to actuate said cutters in one order, means to actuate said cutters in another order, and means periodically to change the operation of said cutters from one order to another.

16. A machine for making wire fabric comprising means for feeding strand wires, means for feeding stay wires across the strand wires, a plurality of cutters to cut the said wires, cam mechanism to actuate said cutters in one order, cam mechanism to actuate the cutters in another order, and cam mechanism periodically to change the operation of said cutters from one order to another.

17. A machine for making wire fabric comprising means for feeding strand wires, means for feeding stay wires across the strand wires, a plurality of electrodes to weld the strand and stay wires at the intersections, a plurality of cutters to cut the stay wires, means to actuate said cutters and welders in one order, means to actuate said cutters and welders in another order, and means periodically to change the operation of said cutters and welders from one order to another.

18. A machine for making wire fabric comprising means for feeding strand wires, means for feeding stay wires across the strand wires, a plurality of electrodes to weld the strand and stay wires at their intersections, a plurality of cutters to cut the stay wires, cam mechanism to actuate said cutters and welders in one order, cam mechanism to actuate said cutters and welders in another order, and cam mechanism to change the operation of said cutters and welders from one order to another.

19. A machine for making wire fabric comprising means for feeding strand wires, a plurality of mechanisms for feeding stay wires and means to actuate said stay wire feeding mechanisms to space the stay wires at different distances along the strand wires.

20. A machine for making wire fabric comprising means for feeding strand wires, a plurality of oscillating stay wire feeding levers, cam mechanism adapted to operate said levers, and means to shift said cam mechanism from one feeding lever to another.

21. A machine for making wire fabric comprising a plurality of wire cutting mechanisms, a plurality of welding mechanisms, a power shaft, a cam unit on said shaft, a plurality of sets of cams on said unit, certain of said sets adapted to operate said mechanisms in one order and certain of said sets adapted to operate said mechanisms in another order, and means to shift said unit on said shaft to cause a reversal in the order of operation of said mechanisms.

22. A machine for making wire fabric comprising a plurality of wire cutting mechanisms, a plurality of welding electrode mechanisms, a fabric feeding mechanism, a power shaft, a cam unit adapted to operate said mechanisms in one order, and means to shift said unit on said shaft to reverse the order of operation of all of said mechanisms except the fabric feeding mechanism.

23. A welding mechanism comprising a plurality of reciprocating electrodes, a shaft, a cam mechanism on said shaft, and a system of levers associated with said electrodes and adapted to be actuated by said cams whereby said electrodes are actuated.

24. A welding mechanism comprising a plurality of reciprocating electrodes, a shaft, a plurality of cam mechanisms on said shaft and adapted to actuate said electrodes, the surfaces on one cam mechanism being arranged inversely to the surface on another cam mechanism, and means for alternately actuating said electrodes by said cam mechanisms so that the order of actuation of said electrodes is alternately reversed.

25. A welding mechanism comprising a pair of reciprocating electrodes, a pair of vertical reciprocating rods to the upper ends of which the electrodes are fastened, a centrally pivoted lever attached to the lower ends of said rods, a roller associated with said lever, a power shaft, and cam mechanism on said power shaft adapted to actuate said roller to cause the reciprocation of said electrodes.

26. A welding mechanism comprising a pair of reciprocating electrodes, a pair of vertical reciprocating rods to the upper ends of which the electrodes are fastened, a centrally pivoted lever attached to the lower ends of said rods, a roller associated with said lever, a power shaft, a plurality of cam members on said power shaft, each of said cam members being adapted to actuate said roller to cause the reciprocation of said electrodes, and means to selectively engage said cam members with said roller.

27. A cutting mechanism comprising a plurality of cutters, reciprocating rods attached to said cutters, oscillating levers associated with said rods, a power shaft, and cam mechanism on said shaft adapted alternately to actuate said oscillating levers.

28. A cutting mechanism comprising a plurality of cutters, a reciprocating rod attached to each cutter, an oscillating lever associated with each rod, said levers being alternately pivoted at opposite ends, a power shaft, cam mechanism on said power shaft, and means for causing the engagement of said cam mechanism alternately with said levers to cause a change in the operation of said cutters.

29. A welding mechanism comprising a plurality of electrodes, means to actuate said electrodes in one order, means to actuate said electrodes in another order, and means periodically to change the operation of said electrodes from one order to another.

30. A welding mechanism comprising a plurality of electrodes, cam mechanism to actuate said electrodes in one order, cam mechanism to actuate said electrodes in another order, and cam mechanism to change the operation of said electrodes from one order to another.

31. A cutting mechanism comprising a plurality of cutters, means to actuate said cutters in one order, means to actuate said cutters in another order, and means periodically to change the operation of said cutters from one order to another.

32. A cutting mechanism comprising a plurality of cutters, cam mechanism to actuate the cutters in one order, cam mechanism to actuate the cutters in another order, and cam mechanism periodically to change the operation of said cutters from one order to another.

33. A machine for cutting and welding wires comprising a plurality of electrodes and a plurality of cutters, means to actuate said cutters and welders in one order, means to actuate said cutters and welders in another order, and means periodically to change the operation of said cutters and welders from one order to another.

34. A machine for cutting and welding comprising a plurality of electrodes and a plurality of cutters, cam mechanism to actuate said cutters and welders in one order, cam mechanism to actuate said cutters and welders in another order, and cam mechanism to change the operation of said cutters and welders from one order to another.

35. A wire cutting and welding machine comprising a plurality of cutters and a plurality of welding electrodes, a power shaft, a cam unit on said shaft, a plurality of sets of cams on said unit, certain of said sets adapted to operate said mechanism in one order and certain of said sets adapted to operate said mechanism in another order, and means for shifting said unit on said shaft to cause a reversal in the order of the operation of said mechanisms.

36. A feeding device comprising a ratchet wheel, a reciprocating pawl adapted to actuate said ratchet, a reciprocating plate normally disposed between said pawl and said ratchet throughout part of the path of movement of said pawl, and cam mechanism adapted to actuate said plate to remove it completely from between the ratchet and the pawl.

37. A wire fabric machine comprising a plurality of wire feed arms, a plurality of rotatable cams adapted alternately to actuate said arms, and means to cause the alternate actuation of said arms by said cams.

38. A wire fabric machine comprising a plurality of wire feeding arms adapted to feed wires in different directions, and a plurality of cam surfaces alternately to actuate said arms.

39. A wire fabric machine comprising a plurality of wire feeding mechanisms, means for actuating one of said mechanisms during one interval, and means for actuating another of said feeding mechanisms during another interval.

40. A wire fabric machine comprising means for feeding longitudinal wires and a plurality of means for feeding stay wires across said longitudinal wires, means for feeding the fabric during one interval by successive steps of a certain length, and means for feeding said fabric during another interval by steps of a different length.

41. A welding machine comprising a plurality of welding electrodes, means for operating said electrodes in a given order, and means dependent upon the operation of said machine for changing said order of operation.

42. A method of making wire fabric, which comprises advancing a plurality of strand wires, feeding stay wires of different characteristics in opposite directions on to said strand wires and joining said stay wires to said strand wires.

43. A method of making wire fabric, which comprises advancing a plurality of strand wires, feeding stay wires of different characteristics on to said strand wires, spacing said wires of different characteristics at different intervals on said strand wires and joining said stay wires to said strand wires.

44. A method of making wire fabric, which comprises advancing a plurality of strand wires, alternately applying across said strand wires a series of light stay wires and a series of heavier stay wires, spacing the light wires at different intervals from each other than the intervals between the heavier wires and joining said stay wires to said strand wires.

In witness whereof, we hereunto subscribe our names this 12th day of September A. D., 1919.

OTTO MULLER, Jr.
GEORGE W. BURCHETT.